(12) United States Patent
Kamstrup (10) Patent No.: US 11,882,163 B2
(45) Date of Patent: Jan. 23, 2024

(54) SYSTEM AND METHOD FOR VISUAL AND AUDITORY COMMUNICATION USING CLOUD COMMUNICATION

(71) Applicant: GN Audio A/S, Ballerup (DK)

(72) Inventor: Lisa Rørbæk Kamstrup, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 0 days.

(21) Appl. No.: 17/464,883

(22) Filed: Sep. 2, 2021

(65) Prior Publication Data
US 2022/0103606 A1 Mar. 31, 2022

(30) Foreign Application Priority Data
Sep. 29, 2020 (DK) .......................... PA 2020 70659

(51) Int. Cl.
*H04L 29/06* (2006.01)
*H04L 29/08* (2006.01)
(Continued)

(52) U.S. Cl.
CPC .......... *H04L 65/403* (2013.01); *G06T 11/001* (2013.01); *G06T 11/60* (2013.01); *H04L 67/10* (2013.01)

(58) Field of Classification Search
CPC ....... H04L 65/403; H04L 67/10; H04L 67/53; G06T 11/001; G06T 11/60
(Continued)

(56) References Cited

U.S. PATENT DOCUMENTS

| 8,514,263 B2 * | 8/2013 | Periyannan | H04N 7/141 348/14.02 |
| 2007/0188597 A1 | 8/2007 | Kenoyer | |

(Continued)

FOREIGN PATENT DOCUMENTS

WO 2019217531 A1 11/2019

OTHER PUBLICATIONS

Search Report issued in Danish Application No. PA 2020 70659, dated Apr. 23, 2021.
(Continued)

*Primary Examiner* — Ruolei Zong
(74) *Attorney, Agent, or Firm* — HAMRE, SCHUMANN, MUELLER & LARSON, P.C.

(57) ABSTRACT

Disclosed is a method and a system configured to be arranged at a location. The system being configured for visual and auditory communication between one or more at-location participants and one or more far-end participants. The system comprising an audio/video (AV)-system. The AV-system comprising an audio component for audio transmission and a video component for video transmission. The AV-system is configured for providing a video-feed from the location. The AV-system is configured to connect to a unified communication cloud server for enabling/performing cloud communication service. The system comprising a functionality service software embedded in the AV-system. The functionality service software being configured for controlling a number of functionalities of the video-feed to generate a processed video-feed. The processed video-feed from the location is configured to be provided to the far-end participant(s) via the cloud communication service.

16 Claims, 7 Drawing Sheets

(51) Int. Cl.
  *G06T 11/00* (2006.01)
  *G06T 11/60* (2006.01)
  *H04L 65/403* (2022.01)
  *H04L 67/10* (2022.01)

(58) Field of Classification Search
  USPC .......................................................... 709/204
  See application file for complete search history.

(56) References Cited

U.S. PATENT DOCUMENTS

| | | |
|---|---|---|
| 2012/0062594 A1 | 3/2012 | Campbell |
| 2012/0124476 A1* | 5/2012 | Chang ................. H04M 3/5166 345/173 |
| 2013/0318574 A1* | 11/2013 | Brink .................... H04L 63/065 726/4 |
| 2014/0191976 A1* | 7/2014 | Peevers .................. G09B 5/067 345/173 |
| 2014/0195222 A1* | 7/2014 | Peevers ................. G10L 21/003 704/201 |
| 2014/0267571 A1* | 9/2014 | Periyannan ......... H04L 12/1827 348/14.08 |
| 2014/0317532 A1* | 10/2014 | Ma ......................... H04N 7/152 715/753 |
| 2014/0328509 A1 | 11/2014 | Guissin et al. |
| 2016/0005281 A1* | 1/2016 | Laska .................... H04N 7/181 348/143 |
| 2016/0149839 A1 | 5/2016 | Yi et al. |
| 2016/0295128 A1* | 10/2016 | Schnittman ............. G10L 25/57 |
| 2017/0026333 A1 | 1/2017 | Pitroda |
| 2017/0318261 A1 | 11/2017 | Dalvi et al. |
| 2020/0145241 A1 | 5/2020 | Anderson et al. |
| 2020/0304713 A1* | 9/2020 | Zhao ........................ H04N 7/15 |

OTHER PUBLICATIONS

The extended European search report issued in European application No. 21196923.3, dated Feb. 18, 2022.
Xavier Rafael et al: "Resource Allocation Algorithms for Multicast Streaming in Elastic Cloud-Based Media Collaboration Services", 2016 IEEE 9th International Conference on Cloud Computing (CLOUD), IEEE, Jun. 27, 2016 (Jun. 27, 2016), pp. 947-950, XP033048012.
Anonymous: "Jabra PanaCast", Sep. 7, 2020 (Sep. 7, 2020), XP055889156, Retrieved from the Internet: URL: http://web.archive.org/web/20200907203041/https://www.jabra.co.uk/ business/video-conferencing/jabra-panacast.

* cited by examiner

SYSTEM AND METHOD FOR VISUAL AND AUDITORY COMMUNICATION USING CLOUD COMMUNICATION

FIELD

The present disclosure relates to a method and a system configured to be arranged at a location. The system being configured for visual and auditory communication between one or more at-location participants and one or more far-end participants. The system comprising an audio/video (AV)-system. The AV-system comprising an audio component for audio transmission and a video component for video transmission. The AV-system is configured for providing a video-feed from the location.

BACKGROUND

Using cloud communication for video conferences is increasing. The cloud communications may be Internet-based data communications where telecommunications applications, switching and storage may be hosted by a third-party outside of the organization using them, and they may be accessed over the public Internet. Cloud services may be defined as data-center-hosted services that are run and accessed over an Internet infrastructure.

There is a need for an improved system and method for performing video conferences using cloud communication.

SUMMARY

Disclosed is a system configured to be arranged at a location. The system being configured for visual and auditory communication between one or more at-location participants and one or more far-end participants. The system comprising an audio/video (AV)-system. The AV-system comprising an audio component for audio transmission and a video component for video transmission. The AV-system is configured for providing a video-feed from the location. The AV-system is configured to connect to a unified communication cloud server for enabling/performing cloud communication service. The system comprising a functionality service software embedded in the AV-system. The functionality service software being configured for controlling a number of functionalities of the video-feed to generate a processed video-feed. The processed video-feed from the location is configured to be provided to the far-end participant(s) via the cloud communication service.

The system may be a video conference system for performing video conferences. The system is typically arranged at a location. The location may be a room, such as a meeting room at an office space, or a conference room or huddle room. The location may be outside an office space, e.g. at a home office or a client office. The location may be inside a building or outside. The system may be a stationary system. The system may not be a handheld system. The system may or may not be portable.

The system is configured for visual and auditory communication, which may be video conference calls and/or broadcasts. Broadcasts may be live or recorded.

The system is configured for communication between one or more at-location participants and one or more far-end participants. The at-location participants are physically present at the physical location of the system, e.g. in the meeting room where the system is located. The far-end participants are not present at the physical location of the system. The far-end participants are present at a remote location, such as in their own homes, in another office building, in another city, another country, etc. There may be one or more at-location participants, e.g. one or more people at the location. There may be one or more far-end participants, e.g. one person in a first remote location, and another person in a second remote location. Thus, the system may provide communication between more than two locations, such as three, four or more locations.

The system comprises an audio/video (AV)-system. The AV-system comprises an audio component for audio transmission. The AV-system comprises a video component for video transmission. The audio component and the video component may be provided in one single AV device, such as an all-in-one device or integrated device. The audio component and the video component may be provided in two separate devices. The AV system/device may be Internet connected, untethered, Internet-of-Things (IoT)—enabled itself. The AV system/device may be connected to a host, such as a computer, pc, tablet, or mobile phone, where the host may have the Internet connection. The AV system may have the video component arranged external from the audio component.

The video component is configured for video recording of one or more at-location participants and/or of the location. The location may comprise walls, floor, ceiling, doors, window, tables, screens, whiteboards, blackboards, posters. The recorded, and e.g. processed, video feed is configured to be sent to the far-end participant(s). The video component comprises one or more cameras for capturing the location. The video component may e.g. be the so-called Jabra Panacast system.

The video component may also comprise a display or screen, such as a TV screen, at the location which the at-location participants can see. The display or screen may show the far-end participants, e.g. by displaying a video-feed of the far-end participant(s) or by showing a picture of the far-end participant(s) or showing a symbol, if the far-end participants do not have video recording enabled at their remote location.

The TV display/screen at the location may also show the video-feed as the far-end participant(s) see it, including any added functionalities.

The audio component comprises one or more input transducer, such as microphones, for capturing voices of the at-location participant(s). The audio component may also transmit audio from the far-end caller(s) to the location via an output transducer, such as a speaker. The audio component may be a speakerphone at the location. The audio component may be a separate microphone and a separate speaker.

The AV-system is configured for providing a video-feed from the location. The video-feed may be a real-time video recording at the location. The video-feed may be a video recording of the entire time period where the system is performing the communication.

The AV-system is configured to connect to a unified communication cloud server for enabling/performing cloud communication service. The connection between the AV-system and the unified communication cloud server may be a wireless connection.

The unified communication cloud server may be a cloud server of a unified communication provider, such as the provider of e.g. the cloud communication services like Microsoft "Teams", "Zoom", "Skype", "Bluejeans" etc. The cloud communication service may be provided by means of a software application, i.e. an app, provided by the unified communication provider. The unified communication provider is a third party in the present system.

The cloud communication service differs from traditional IP calls, phone call, and smartphone call. The cloud communication service requires using an app or webpage to perform the communication through. The cloud communication service can be performed using an electronic device, such as a computer, pc, tablet or smart phone.

The cloud communication does not use or require traditional telephony, which may be defined as operation of telephones and telephonic systems and as a system of telecommunications in which telephonic equipment is employed in the transmission of speech or other sound between points, with or without the use of wires.

The cloud communications may be Internet-based voice and data communications where telecommunications applications, switching and storage may be hosted by a third-party outside of the organization using them, and they may be accessed over the public Internet. Data may comprise audio and/or video. Cloud services may be defined as data-center-hosted services that are run and accessed over an Internet infrastructure. Cloud services may handle data as well as audio and video, because with the use of VoIP (voice over Internet protocol), voice has become part of the cloud services. Cloud telephony, also known as hosted telephony, may refer specifically to voice services and more specifically the replacement of conventional business telephone equipment, such as a private branch exchange (PBX), with third-party VoIP service.

Cloud communications providers may deliver voice, audio, video and data communications applications and services, hosting them on servers that the providers own and maintain, giving their customers access to the "cloud."

The system, such as the AV-system, may comprise application programming interface (API) and/or software development kit (SDK) with the unified cloud communication server/providers for allowing communication and various features and functionalities.

The SDK/API is a software tool or solution which is configured to easily integrate the system provider, e.g. Jabra, application to 3rd part applications, thereby allowing applications to communicate across on the system provider hardware, e.g. Jabra hardware, such as the AV-system and device(s).

A software development kit (SDK) is a collection of software development tools in one installable package. They ease creation of applications by having compiler, debugger and perhaps a software framework. They are normally specific to a hardware platform and operating system combination. To create applications with advanced functionalities, application software developers may use specific software development kits.

Some SDKs may be required for developing a platform-specific app. SDKs may add additional features and can be installed in apps to provide analytics, data about application activity etc.

An SDK can take the form of application programming interfaces (APIs) in the form of on-device libraries of reusable functions used to interface to a particular programming language, or it may be as complex as hardware-specific tools that can communicate with a particular embedded system. Common tools include debugging facilities and other utilities, often presented in an integrated development environment (IDE). SDKs may include sample software and/or technical notes along with documentation, and tutorials to help clarify points made by the primary reference material.

An application programming interface (API) is a computing interface which defines interactions between multiple software intermediaries. It defines the kinds of calls or requests that can be made, how to make them, the data formats that should be used, the conventions to follow, etc. It can also provide extension mechanisms so that users is can extend existing functionality in various ways and to varying degrees. An API can be entirely custom, specific to a component, or it can be designed based on an industry-standard to ensure interoperability. Through information hiding, APIs enable modular programming, which allows users to use the interface independently of the implementation.

The system comprises a functionality service software embedded in the AV-system. The functionality service software is configured for controlling a number of functionalities of the video-feed to generate a processed video-feed. Thus, the system is configured for providing augmentations in the visual communication. The augmentation may be add-on of digital content and/or image processing features such as object and face recognition etc. Furthermore, the functionality service software may also be configured for controlling audio of the system.

The processed video-feed from the location is configured to be provided to the far-end participant(s) via the cloud communication service.

Also disclosed is a method for performing visual and auditory communication using a system at a location. The communication being between one or more at-location participants and one or more far-end participants. The system comprising an audio/video (AV)-system comprising an audio component for audio transmission and a video component for video transmission. The system comprising a functionality service software embedded in the AV-system. The method comprises providing, by the AV-system, a video-feed from the location. The method comprises connecting, by the AV-system, to a unified communication cloud server for enabling/performing cloud communication service. The method comprises controlling, by the functionality service software, a number of functionalities of the video-feed to generate a processed video-feed. The method comprises providing the processed video-feed from the location to the far-end participant(s) via the cloud communication service.

The system and method as disclosed provide the advantage of providing a consistent user interface and user experience across multiple devices and media types. Thus the system, user interface and user experience will be consistent for the user, e.g. the at-location participant(s) and/or the far-end participant(s), independent of which unified communication cloud server that is used. Thus, the system may be an agnostic service or system. The system, user interface and user experience will function and look the same for the user(s) each time they use the system, even though the unified communication cloud server differs. Thus, for the user, the system, user interface and user experience will be the same independently of whether the unified communication cloud server is "Teams", "Zoom", "Skype", or "Bluejeans" etc.

It is a further advantage of the system and method that the video-feed is processed in the AV-system, and not by the unified communications provider.

It is an advantage of the system and method that the speed of processing may be increased, and that data privacy may be provided or improved.

The system and method as disclosed provides an advantage over current unified communication (UC) providers, as current UC augmentation services only work well in single-person setup (singular face-recognition). The disclosed system and method works well with more than one at-location participant, as the system and method is configured to perform people recognition when more than one person is at the location, and also configured to perform object recognition, such as recognising whiteboards, glass walls, posters, chairs etc.

It is a further advantage of the disclosed system and method that its functionalities are available in a conference system setup, where the UC solutions are only available from laptop UC applications, like MS Teams background blur.

It is a further advantage of the present system and method that the functionality service software is embedded in the AV-system as this provides that there may be no latency, such as no noticeable latency, in the image computation. The current UC solutions run in a UC app, which causes sensitivity towards in-picture movement, which may result in a latency in processing compared to running in embedded software of the AV-device of the present system and method.

It is a further advantage that the functionality service software is configured for controlling a number of functionalities of the video-feed to generate a processed video-feed. Thus, the system is configured for providing augmentations in the visual communication. The augmentation may be add-on of digital content and/or image processing features such as object and face recognition etc. In current solutions, augmentations may only be performing background blurring or background replacements and only for single-person setup.

In some embodiments, the video component comprises three cameras for providing a field of view of about 140 to 180 degrees of the location. In some embodiments, the audio component comprises a speakerphone.

The video component may comprise one camera, two cameras, three cameras or more. For example, three cameras provides that the field of view can be between about 140 to 180 degrees. The video component comprising the one or more cameras may be attached to a wall at the location, such as under a screen or display. The screen or display may also be part of the video component, as the at-location participant(s) can watch a corresponding video-feed of the far-end participants(s) on the screen, and/or see the processed video-feed of the location, e.g. showing themselves. The video component and/or the one or more cameras may alternatively be arranged on a stand or tripod on the floor, or be placed on a table etc.

If the video component comprises three cameras or three camera lenses, the camera may provide a depth measure of the location.

The video component and/or camera may be a Jabra Panacast video conference system.

In some embodiments, the functionality service software controlling the number of functionalities of the video-feed comprises performing in-picture add-on augmentations in the processed video-feed. The in-picture add-on may be in-video add-ons.

In some embodiments, the in-picture add-on augmentations comprise applying digital content in the processed video-feed.

The system further provides that the participants can scale the digital content, e.g. enlarging or minimizing the digital content, to whatever suites the participants best. Thus, the participants can decide how much the digital content can take up of space compared to the captured participants in the video feed. This may apply to both the at-location participants and/or the far-end participants.

In some embodiments, the digital content comprises digital presentations and/or information of identification of at-location participant(s). The digital presentation may e.g. be a powerpoint presentation, a pre-recorded video etc, which for example may be displaying in a corner or free space of the processed video-feed view. This may be defined as digital content.

The information of identification of at-location participant(s) may be applying an ID tag in the processed video feed, e.g. next to each at-location participant. This may be provided all the time, or only in the beginning of a meeting, or only when the specific person is talking/presenting. The ID information may be obtained from a calendar app comprising meeting information on all participants and/or from work place ID. The information of the at-location participants can be provided via open API/SDK between the system and the unified cloud communication service or a $3^{rd}$ part service. For example, merging e.g. a PowerPoint presentation into the video feed may be provided by a subset service, e.g. $3^{rd}$ part service, to the unified communication service.

In some embodiments, the functionality service software controlling the number of functionalities of the video-feed comprises performing people/object recognition of the at-location participants and/or of one or more physical objects at the location. The people recognition may be performed by means of face recognition and/or person recognition. In prior art, only one person may be recognized, socalled singular face recognition, and the background may be blurred behind that one person. In the present system, a number or plurality of persons may be detected in the location, and the background may be blurred behind all, some or one of the at-location participants. The functionality service software may be trained by artificial intelligence (AI) to recognize a plurality of persons. The system may comprise a user interface where the number of people at the location can be entered, which may assist the system in recognition the correct number of faces. The physical objects at the location which can be recognized may be whiteboards, blackboards, posters etc. The functionality service software may be trained by artificial intelligence (AI) to recognize specific objects, such as whiteboards, posters etc.

In some embodiments, the functionality service software controlling the number of functionalities of the video-feed comprises displaying a recognized physical object at the location. After recognition of a specific physical object, the object may then be displayed in the processed video-feed, such as in a highlighted, focused or enhanced manner. This could be displaying a physical whiteboard where things are written or drawn on, i.e. this may be defined as analog content.

In some embodiments, the functionality service software controlling the number of functionalities of the video-feed comprises performing image processing of the video-feed.

In some embodiments, the image processing comprises highlighting and/or down-toning one or more of the at-location participants and/or one or more physical objects at the location. For example, the at-location participant who is presently speaking or presenting may be highlighted, and the other at-location participant(s) who is/are silent, not speaking and not presenting, may be downtoned. For example, a whiteboard which is used to present content on, may be highlighted. The highlighting may be performed by adding e.g. yellow color to the participant(s) and/or object(s).

In some embodiments, the image processing comprises transparency control of one or more at-location participants. For example a person standing in front of power point presentation, which is a digital content, or in front of a whiteboard, which is analog content, can be made transparent to provide full view of the power point presentation or the whiteboard for the far-end participant(s).

In some embodiments, the functionality service software controlling the number of functionalities of the video-feed comprises controlling whether the processed video-feed displays:
- a zoom-in on one at-location participant, or
- an overview of all the at-location participants and/or an overview of the location, or
- a cropping to only show a part of the location.

In some embodiments, the functionality service software controlling the number of functionalities of the video-feed comprises controlling whether the processed video-feed displays digital content D, analog content A, a zoom-in Z on one at-location participant, and/or an overview O of all the at-location participants and/or an overview of the location.

It is an advantage that the functionality service software controls what the processed video-feed displays, as this may provide a consistent experience for the participants and user.

In some embodiments, one or more criteria determine which functionality/ies of the number of functionalities that should be applied to the video-feed at a certain time. The one or more criteria may be pre-defined criteria or rules in the AV-system and/or may be defined by the at-location and/or far-end participants before and/or during the meeting. The criteria or rules may be for example when to show digital content, when to show analog content, when to zoom-in on participants and/or when to display and overview of the location.

In some embodiments, the functionality service software is configured to be controlled:
- not by the unified communication cloud server;
- by the provider of the AV-system/device;
- by the far-end participant(s);
- by the at-location participant(s); and/or
- only by the provider of the AV-system and the at-location participants.

The functionality service software may not be controlled by the unified communication cloud server, as this may not provide a consistent user experience. As the system is configured to be used with different unified communication cloud servers and thereby different unified communication cloud providers, e.g. Zoom, Skype, Teams, Bluejeans etc, the user experience and user interface would be different for each different unified communication cloud server and provider, if the unified communication cloud server and provider could control the functionality service software. Therefore, it is an advantage for the user, that the functionality service software is controlled by the provider of the AV-system, e.g. by Jabra, as this will ensure that the system looks and works the same way every time the participants/users, use the system, despite that the communication is performed via different unified communication cloud servers, i.e an an 'agnostic approach'. The far-end participant(s) and/or the at-location participant(s) may also be able to control the functionality service software. In some embodiments, the functionality service software may only be controlled by the provider of the AV-system and/or the at-location participants.

Thus, the AV-system is configured to connect to the unified communication cloud server, via a provider cloud server, for enabling/performing cloud communication service. The provider cloud server may be the provider of the AV-system, e.g. Jabra. Thus, the connection may be between the AV-system and the provider cloud server. The processed video-feed from the location is configured to be provided to the far-end participant(s) via the cloud communication service via the provider cloud server. The provider cloud server is configured to communicate with the unified communication cloud server.

In some embodiments, the control of the functionality service software is configured to be embedded in the unified communication cloud server. For example, the participants may have an option in the user interface of the unified communication cloud server, e.g. in MS Teams, to use an 'add tab' option which allows the participants to add 3rd party apps to the user interface of the unified communication cloud server. This provides that the user interface is designed how the 3rd party app provider wants it to be, but there is a short-cut to the app, via the unified communication cloud server, e.g. Teams. This provides an indirect control from the unified communication cloud server platform, also known as app-in-app integration.

In some embodiments, the functionality service software is configured to be controlled via:
- the AV-system, and/or
- via an electronic device of the far-end participant(s), and/or
- via a control interface in connection with the AV-system.

The functionality service software may be controlled directly via the AV-system such as buttons or touch panels on the video and/or audio component of the AV-system. The functionality service software may be controlled via an electronic device at the far-end participant(s), e.g. a computer, pc, smart phone etc. The functionality service software may be controlled via a control interface in connection with the AV-system such as a remote control, a tablet, a touch pad etc, which is connected to the AV system but is a separate device from the AV-system.

The present invention relates to different aspects including the system described above and in the following, and corresponding system parts, methods, devices, systems, networks, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment is needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 1A:
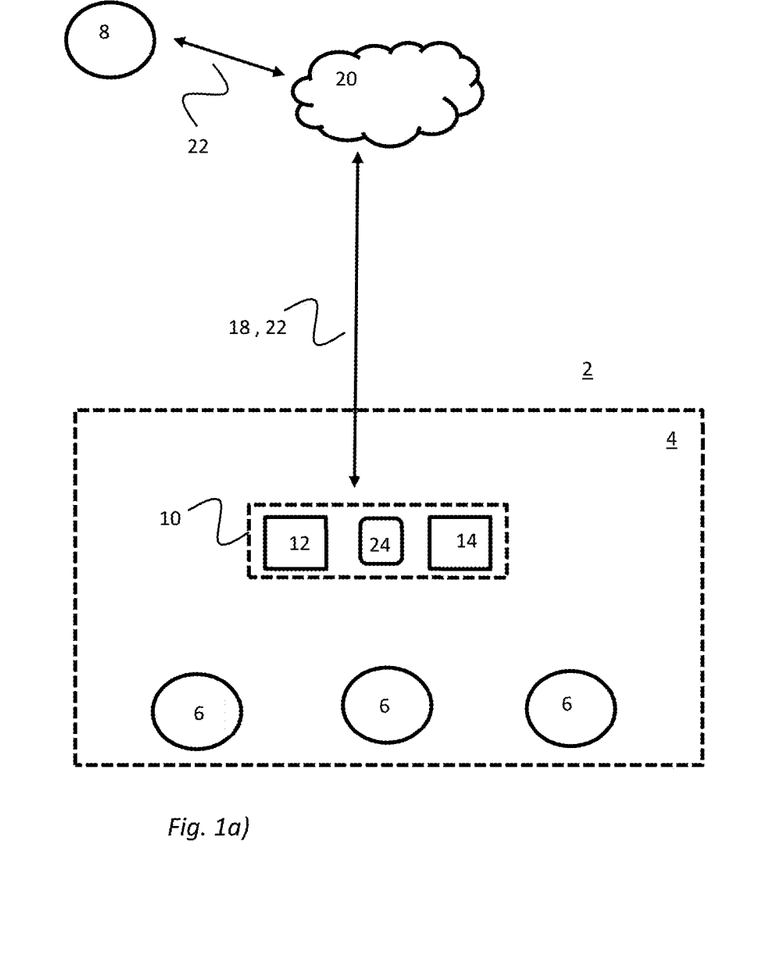
FIGS. 1a), 1b), 1c) and 1d) schematically illustrate an example of a system configured to be arranged at a location. These figures show different examples of connections.

FIGS. 1a), 1b), 1c) and 1d) schematically illustrate an example of a system 2 configured to be arranged at a location 4. The system 2 being configured for visual and auditory communication between one or more at-location participants 6 and one or more far-end participants 8. The system 2 comprising an audio/video (AV)-system 10. The AV-system 10 comprising an audio component 12 for audio transmission and a video component 14 for video transmission. The AV-system 10 is configured for providing a video-feed from the location 4. The AV-system 10 is configured to connect 18 to a unified communication cloud server 20 for enabling/performing cloud communication service 22. The system 2 comprising a functionality service software 24 embedded in the AV-system 10. The functionality service software 24 being configured for controlling a number of functionalities of the video-feed to generate a processed video-feed. The processed video-feed from the location 4 is configured to be provided to the far-end participant(s) 8 via the cloud communication service 22.

Figure 1B:
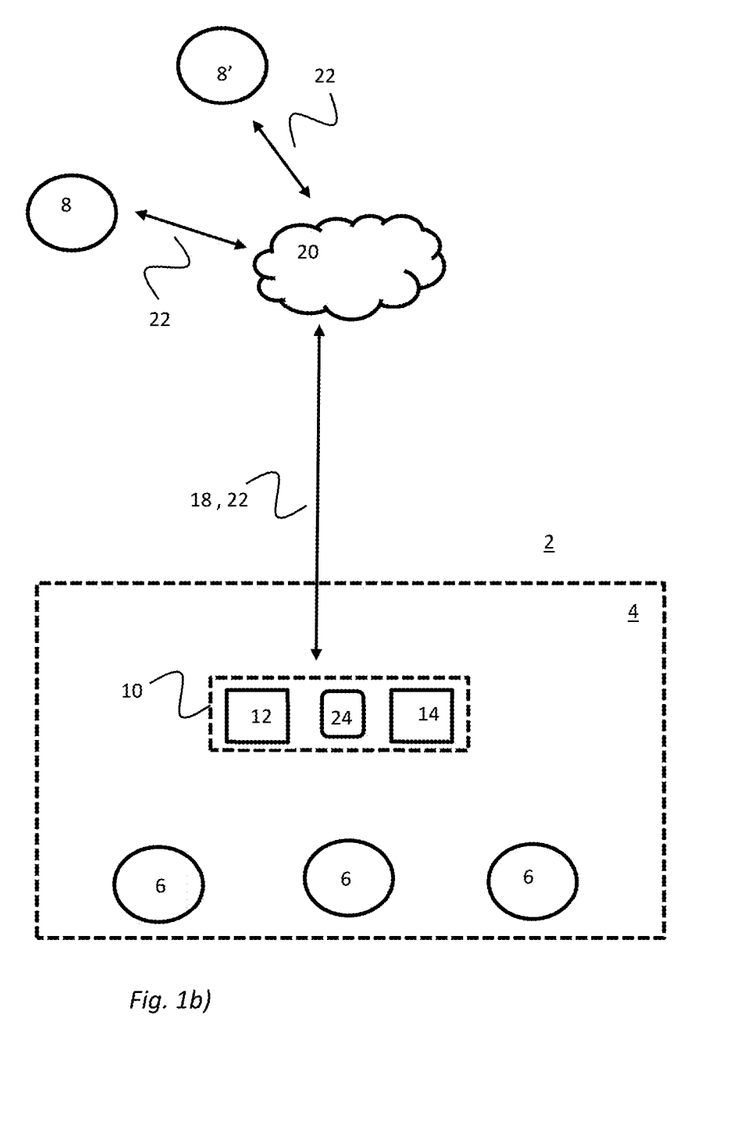

Furthermore, FIG. 1b) schematically illustrates a second far-end participant 8'. The processed video-feed from the location 4 is configured to be provided to the second far-end participant 8' via the cloud communication service 22.

Figure 1C:
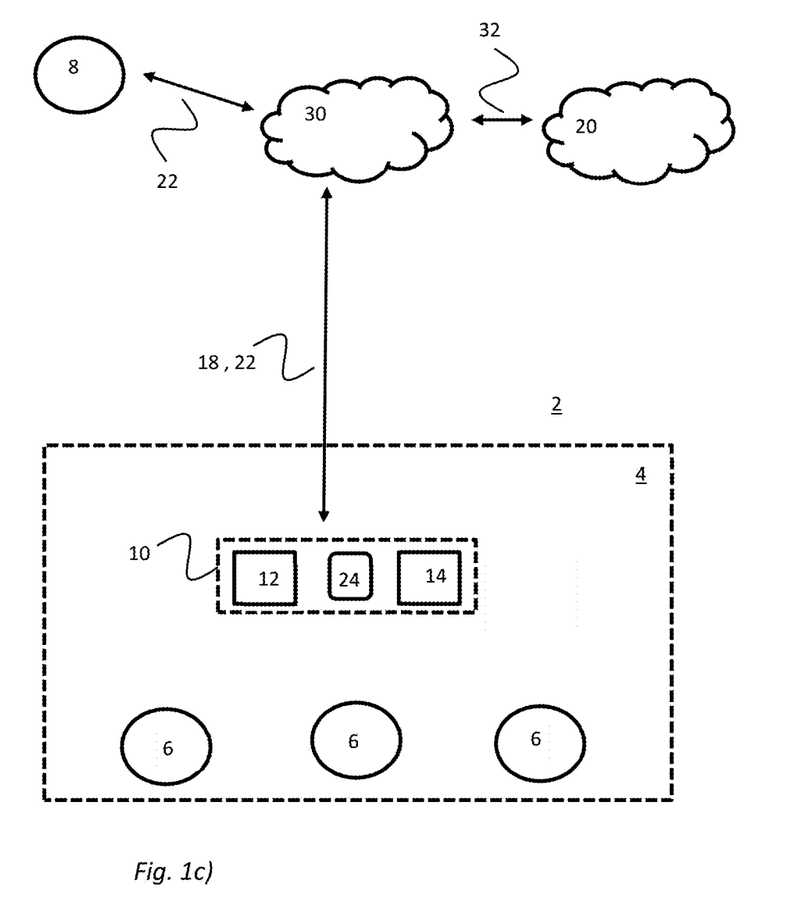

Furthermore, FIG. 1c) schematically illustrates that the AV-system 10 is configured to connect 18 to the unified communication cloud server 20, via a provider cloud server 30, for enabling/performing cloud communication service 22. The provider cloud server 30 may be the provider of the AV-system 10, e.g. Jabra. Thus, the connection 18 is between the AV-system and the provider cloud server 30. The processed video-feed from the location 4 is configured to be provided to the far-end participant(s) 8 via the cloud communication service 22 via the provider cloud server 30. The provider cloud server 30 is configured to communicate 32 with the unified communication cloud server 20.

Figure 1D:
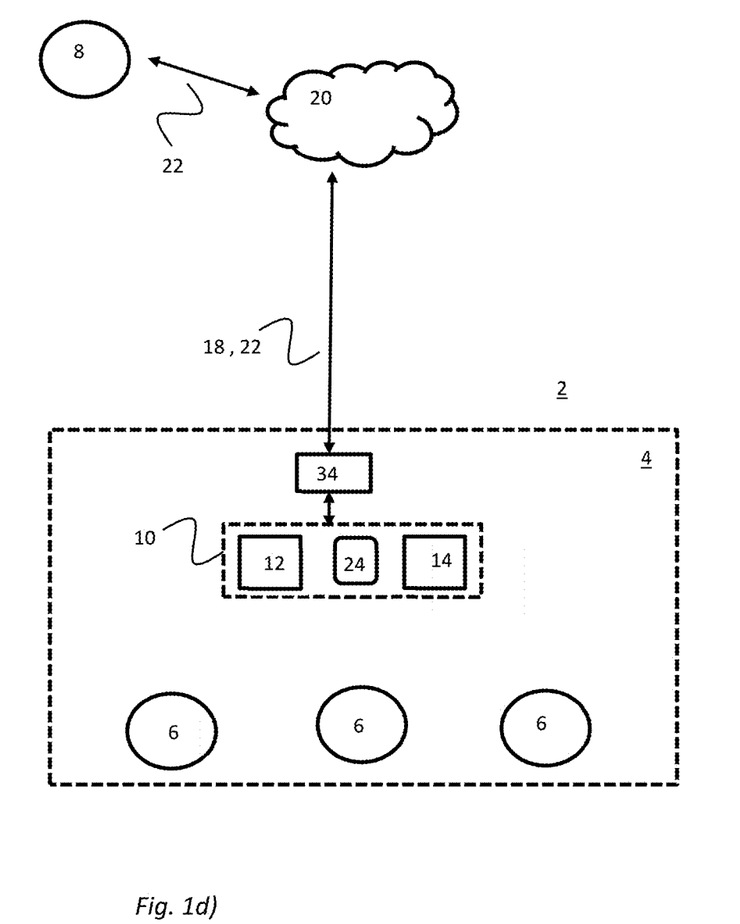

Furthermore, FIG. 1d) schematically illustrates that the AV-system 10 is connected to a host device 34 having the Internet connection for communicating with the cloud server 20. The host device 34 may for example be a computer, pc, tablet, or smartphone. Alternatively, the AV system may be Internet connected, untethered, Internet-of-Things (IoT)—enabled itself.

Figure 2A:
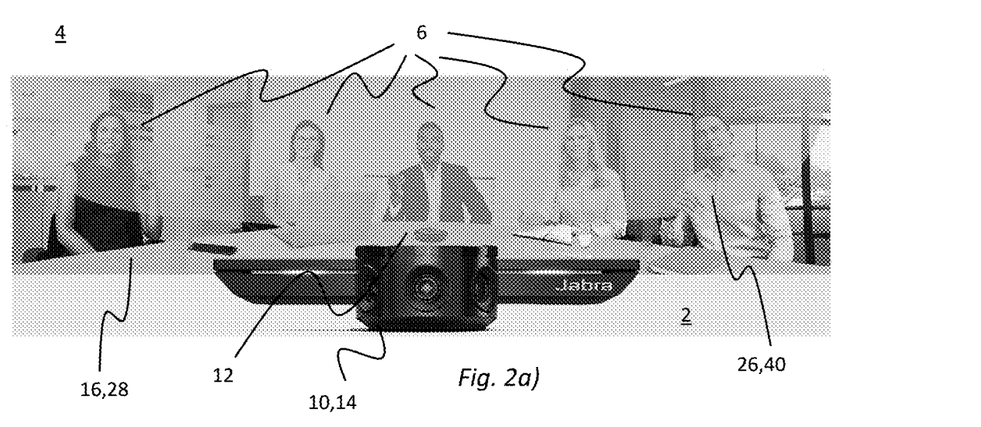
FIGS. 2a), 2b), 2c) and 2d) schematically illustrate an example of a system configured to be arranged at a location. These figures show different examples of functionalities.

FIGS. 2a), 2b), 2c) and 2d) schematically illustrate an example of a system 2 configured to be arranged at a location 4. The system 2 being configured for visual and auditory communication between one or more at-location participants 6 and one or more far-end participants (not shown). The system 2 comprising an audio/video (AV)-system 10. The AV-system 10 comprising an audio component 12 for audio transmission and a video component 14 for video transmission. The AV-system 10 is configured for providing a video-feed 16 from the location 4. The AV-system 10 is configured to connect to a unified communi-cation cloud server for enabling/performing cloud communication service. The system 2 comprising a functionality service software embedded in the AV-system 10. The functionality service software being configured for controlling a number of functionalities 26 of the video-feed 16 to generate a processed video-feed 28. The processed video-feed 28 from the location 4 is configured to be provided to the far-end participant(s) via the cloud communication service.

The video component 14 comprises e.g. three cameras for providing a large field of view, such as of about 140 to 180 degrees of the location. The audio component 12 comprises a speakerphone.

The video component 14 comprising the cameras(s) may be attached to a wall at the location 4, such as under a screen or display. The screen or display may also be part of the video component, as the at-location participant(s) can watch a corresponding video-feed of the far-end participants(s) on the screen, and/or see the processed video-feed of the location, e.g. showing themselves. The video component and/or the one or more cameras may alternatively be arranged on a stand or tripod on the floor, or be placed on a table etc.

If the video component comprises three cameras or three camera lenses, the camera may provide a depth measure of the location, which further provides that the number of people in the field of view of the camera can be determined.

The video component and/or camera may be a Jabra Panacast video conference system.

The functionalities 26 of the video-feed 16 may comprise performing in-picture add-on augmentations in the processed video-feed 28.

The in-picture add-on augmentations may comprise applying digital content in the processed video-feed 28.

The digital content may comprise digital presentations 36 and/or information 38 of identification of at-location participant(s) 6.

Figure 2B:
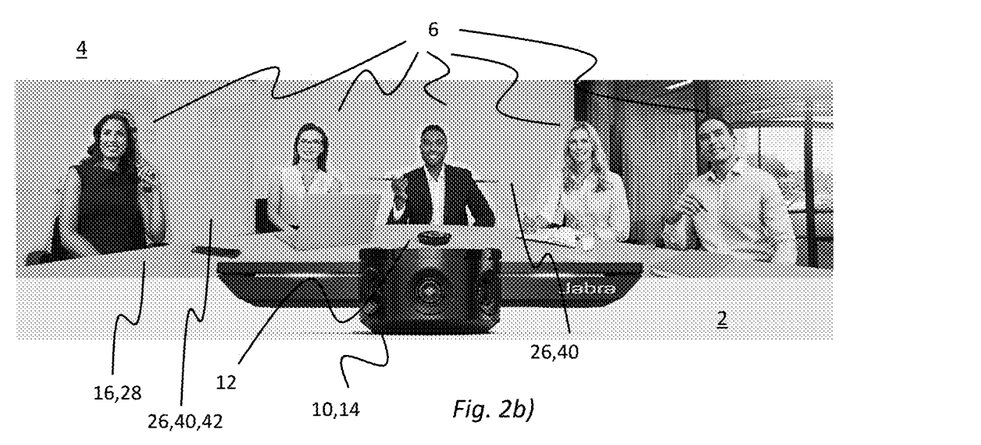
Figure 2C:
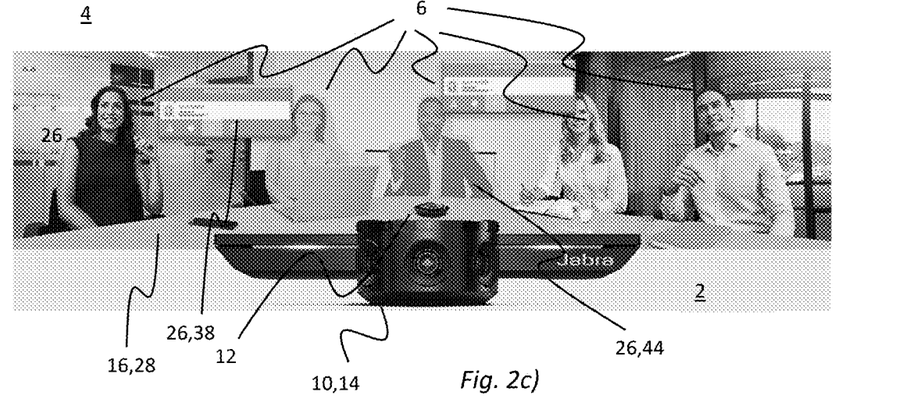
Figure 2D:
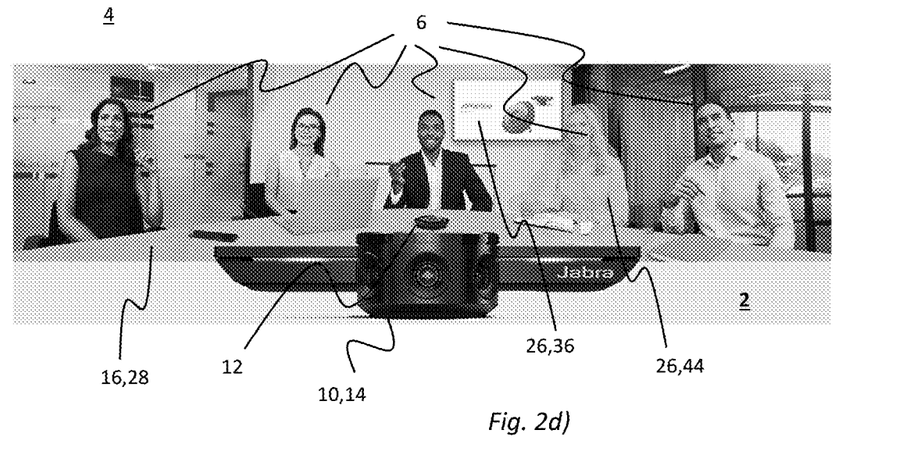

FIG. 2d) shows that the digital presentation 36 may e.g. be a powerpoint presentation, a pre-recorded video etc, which for example can be displayed in a corner or free space of the processed video-feed view.

FIG. 2c) shows that the information 38 of identification of at-location participant(s) may be applying an ID tag in the processed video feed, e.g. next to each at-location participant 6. This may be provided all the time, or only in the beginning of a meeting, or only when the specific person is talking/presenting. The ID information may be obtained from a calendar app comprising meeting information on all participants and/or from work place ID.

The functionalities 26 of the video-feed 16 may comprise performing people/object recognition of the at-location participants 6 and/or of one or more physical objects at the location 4. The people recognition may be performed by means of face recognition and/or person recognition.

FIGS. 2a) and 2b) show that a number or plurality of persons may be detected in the location 4. In FIG. 2a) this is indicated by the color/shade 40 over the at-location participants 6. In FIG. 2b) this is indicated by the color/shade 40 behind, some of, the at-location participants 6.

FIG. 2b) shows that the background may be blurred 42 behind all or some of the at-location participants 6. The functionality service software may be trained by artificial intelligence (AI) to recognize a plurality of persons. The system may comprise a user interface where the number of people at the location can be entered, which may assist the system in recognition the correct number of faces. The physical objects at the location which can be recognized may be whiteboards, blackboards, posters etc. The functionality service software may be trained by artificial intelligence (AI) to recognize specific objects, such as whiteboards, posters etc.

The functionality service software controlling the number of functionalities of the video-feed may comprise displaying a recognized physical object at the location. After recognition of a specific physical object, the object may then be displayed in the processed video-feed, such as in a highlighted, focused or enhanced manner. This could be displaying a physical whiteboard where things are written or drawn on, i.e. this may be defined as analog content.

The functionalities 26 of the video-feed 16 may comprise performing image processing of the video-feed.

FIGS. 2c) and 2d) shows that the image processing may comprise highlighting 44 and/or down-toning one or more of the at-location participants 6 and/or one or more physical objects at the location. For example, the at-location participant 6 who is presently speaking or presenting may be highlighted 44, and the other at-location participant(s) 6 who is/are silent, not speaking and not presenting, may be downtoned. For example, a whiteboard which is used to present content on, may be highlighted. The highlighting 44 may be performed by adding e.g. yellow color to the participant(s) and/or object(s).

The image processing may comprise transparency control of one or more at-location participants. For example a person standing in front of power point presentation, which is a digital content, or in front of a whiteboard, which is analog content, can be made transparent to provide full view of the power point presentation or the whiteboard for the far-end participant(s).

Figure 3:
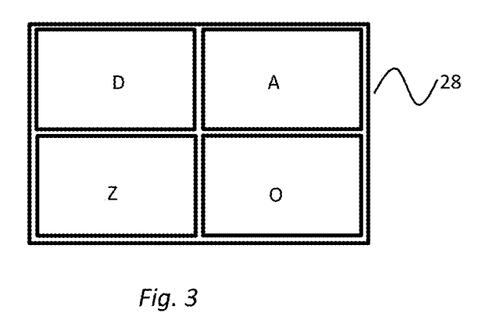
FIG. 3 schematically illustrates the processed video-feed displaying digital content D, analog content A, a zoom-in Z, and/or an overview O.

FIG. 3 schematically illustrates that the functionality service software controlling the number of functionalities 26 of the video-feed 16 may comprise controlling whether the processed video-feed 28 displays digital content D, analog content A, a zoom-in Z on one at-location participant, and/or an overview of all the at-location participants 6 and/or an overview of the location 2.

Furthermore, the system may provide controlling whether the processed video-feed 28 is displays a zoom-in Z on one at-location participant, or an overview O of all the at-location participants and/or an overview of the location, or a cropping to only show a part of the location.

Figure 4:
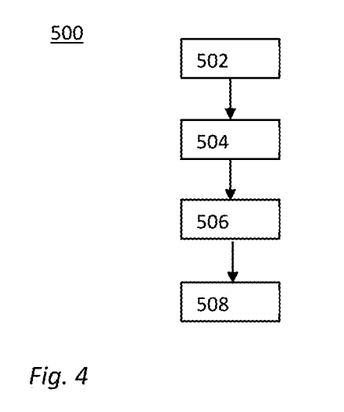
FIG. 4 schematically illustrates a method for performing visual and auditory communication using a system at a location.

FIG. 4 schematically illustrates a method 500 for performing visual and auditory communication using a system at a location. The communication being between one or more at-location participants and one or more far-end participants. The system comprising an audio/video (AV)-system comprising an audio component for audio transmission and a video component for video transmission. The system comprising a functionality service software embedded in the AV-system.

The method comprises providing 502, by the AV-system, a video-feed from the location.

The method comprises connecting 504, by the AV-system, to a unified communication cloud server for enabling/performing cloud communication service.

The method comprises controlling 506, by the functionality service software, a number of functionalities of the video-feed to generate a processed video-feed.

The method comprises providing 508 the processed video-feed from the location to the far-end participant(s) via the cloud communication service.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES 2 system
4 location
6 at-location participants
8 far-end participants
10 audio/video (AV)-system
12 audio component
14 video component
16 video-feed
18 connection
20 unified communication cloud server
22 cloud communication service
24 functionality service software
26 functionalities
28 processed video-feed
30 provider cloud server
32 communication
34 host device
36 digital presentations
38 information of identification of at-location participant(s)
40 color/shade over/behind at-location participant(s)
42 background blur
44 highlighting at-location participant(s)
D digital content
A analog content
Z zoom-in on one or more at-location participant(s)
O overview of all the at-location participant(s) and/or of the location
500 method for performing visual and auditory communication
502 method step of providing, by the AV-system, a video-feed from the location
504 method step of connecting, by the AV-system, to a unified communication cloud server for enabling/performing cloud communication service
506 method step of controlling, by the functionality service software, a number of functionalities of the video-feed to generate a processed video-feed
508 method step of providing the processed video-feed from the location to the far-end participant(s) via the cloud communication service

The invention claimed is:

1. A system, the system being configured for visual and auditory communication between one or more at-location participants and one or more far-end participants, the system comprising:
an audio/video (AV)-system, disposed at a location, comprising:
an audio component for audio transmission;
a video component for video transmission;
wherein the AV-system is configured for providing a video-feed from the location;
wherein the AV-system is configured to connect to a unified communication cloud server for providing a cloud communication service; and
an embedded functionality service software configured for controlling a number of functionalities of the video-feed to generate a processed video-feed to provide a consistent user experience for the at-location participants and the far-end participants;

wherein the functionalities of the video-feed include an in-picture add-on augmentation in a corner or free space of the processed video feed, and wherein the processed video-feed from the location is configured to be provided to the far-end participant(s) via the cloud communication service.

2. The system according to claim 1, wherein the video component comprises three cameras for providing a field of view of 140 to 180 degrees of the location, and wherein the audio component comprises a speakerphone.

3. The system according to claim 1, wherein the in-picture add-on augmentation in the processed video-feed comprises a slide multimedia presentation.

4. The system according to claim 3, wherein the in-picture add-on augmentation comprises a pre-recorded video in the processed video-feed.

5. The system according to claim 1, wherein the functionalities of the video-feed comprises at least one of performing people or object recognition of the at-location participants or one or more physical objects at the location.

6. The system according to claim 5, wherein the functionalities of the video-feed comprises displaying a recognized physical object at the location.

7. The system according to claim 6, wherein the functionalities of the video-feed comprises performing image processing of the video-feed.

8. The system according to claim 7, wherein the image processing comprises affecting an emphasis of one or more of the at-location participants or one or more physical objects at the location.

9. The system according to claim 8, wherein the image processing comprises transparency control of one or more at-location participants.

10. The system according to claim 9, wherein the functionalities comprise controlling whether the processed video-feed displays:

a zoom-in on one at-location participant, an overview of at least one of all the at-location participants or an overview of the location, or a cropping to only show a part of the location.

11. The system according to claim 10, wherein one or more criteria determine which of the number of functionalities that should be applied to the video-feed at a certain time.

12. The system according to claim 11, wherein the functionality service software is configured to be controlled:

not by the unified communication cloud server;

by the provider of the AV-system;

by the far-end participant;

by the at-location participants; or only by the provider of the AV-system and the at-location participants.

13. The system according to claim 12, wherein the functionality service software is configured to be controlled via:

the AV-system, via an electronic device of the far-end participant(s), or via a control interface in connection with the AV-system.

14. The system according to claim 1, wherein the AV-system is agnostic to a type of the unified communication cloud server.

15. A method for performing visual and auditory communication using a system, the communication being between one or more at-location participants and one or more far-end participants, wherein the system, disposed at a location, comprises:

an audio/video (AV)-system comprising an audio component for audio transmission and a video component for video transmission, and a functionality service software embedded in the AV-system disposed at the location;

wherein the method comprises:

providing, by the AV-system, a video-feed from the location;

connecting, by the AV-system, to a unified communication cloud server for enabling or performing cloud communication service;

controlling, by the functionality service software, a number of functionalities of the video-feed to generate a processed video-feed, wherein the functionalities of the video-feed include in-picture add-on augmentations in a corner or free space of the processed video feed; and providing the processed video-feed, from the location to the far-end participant(s) via the cloud communication service, that is consistent for the at-location participants and the far-end participants.

16. The method according to claim 15, wherein the AV-system is agnostic to a type of the unified communication cloud server.

* * * * *